Nov. 17, 1959  C. B. SPASE  2,913,085
FRICTION SHOE
Filed Aug. 29, 1957

INVENTOR.
Charles B. Spase
BY
D. Emmett Thompson
ATTORNEY.

United States Patent Office 2,913,085
Patented Nov. 17, 1959

2,913,085

FRICTION SHOE

Charles B. Spase, Syracuse, N.Y., assignor to Lipe-Rollway Corporation, Syracuse, N.Y., a corporation of New York Application August 29, 1957, Serial No. 681,122

1 Claim. (Cl. 192—107)

This invention relates to friction shoes intended especially for use in clutches where there is normally, during the operation of the clutch, an appreciable amount of slippage between the shoes and the friction member with which they are in contact. A clutch of that order is of the speed limiting and torque metering type employed especially for driving accessories from an automobile engine. A clutch of that type is disclosed in my prior Patent 2,758,689, issued August 14, 1956. Such clutches are mounted upon the crank shaft of the engine and are employed to drive the accessories, such as the radiator cooling fan, generator, power steering pump, etc.

In these clutches, the friction shoes are spring pressed against a driving drum and, when the drum reaches a predetermined speed, the frictional engagement between the drum and shoes is reduced by the centrifugal action of the shoes. However, the frictional engagement between the drum and shoes has to be sufficient to transmit the necessary torque to drive the accessories under full load. This continual slippage at ordinary driving ranges, and the transmission of relatively high torque create a very serious problem in that the friction shoes are rapidly worn out and the frictional engagement between the drum and shoes is changed by the excessive wear whereby, with friction shoes formed of conventional materials, the performance of the clutch varies considerably throughout the life of the clutch.

This invention has as an object a friction shoe having a frictional drum engaging surface that is particularly hard, giving the shoe an exceptionally long wearing life and being substantially unaffected by the heat generated during the slippage, all whereby the maintenance of the clutch is reduced to a minimum and the clutch functions uniformly over long periods of use.

The invention consists in the novel features and in combinations and constructions hereinafter set forth and claimed.

In describing this invention, reference is had to the accompanying drawings in which like characters designate corresponding parts in all the views.

In the drawings—

Figure 1:
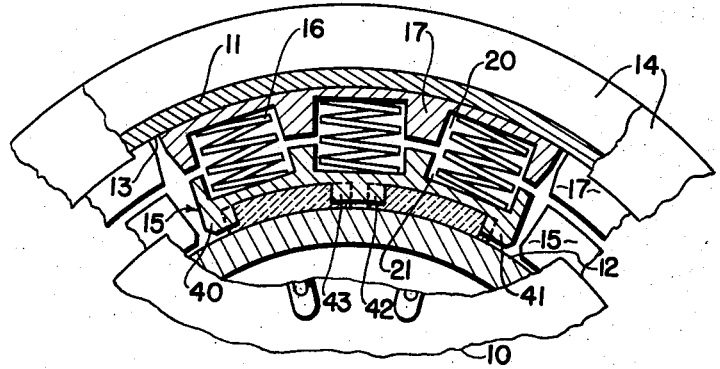
Figure 1 is a sectional view of a friction shoe embodying my invention and contiguous portions of a clutch structure in which it may be used.

As shown in Figure 1, the clutch has a driving member 10, and a driven member 11, these members being positioned in spaced concentric relation. The driving member 10 has a peripheral drum surface 12 engaged by the friction shoes which are operatively connected to the driven member 11. The driving drum 10 is mounted upon and connected to the crank shaft of the automobile engine, as disclosed in my prior patent referred to.

In the arrangement shown in Figure 1, the driven member 11 is formed with a circular friction surface 13 encircled by a sheave construction 14 to receive a V belt extending to one or more of the accessories. In this figure, the friction shoes are designed generally at 15, and are spring pressed against the driving drum 10 by springs 16, these springs acting against outer shoes 17 engaging the surface 13 on the driven member 11. The inner and outer shoes 15, 17, are formed with aligned radially disposed recesses in which the compression springs 16 are mounted, whereby the springs serve to yieldingly urge the clutch shoes 15 into engagement with the driving member 10, and to urge the outer shoes 17 into engagement with the driven member 11. The arrangement embodying the use of the outer shoes 17 forms no part of this invention.

The springs 16 may be mounted in recesses formed in the driven member 11, or the driven member 11 may be formed with inwardly projecting portions to engage the inner shoes 15 to effect a driving connection between the inner shoes and the driven member.

Figure 2:
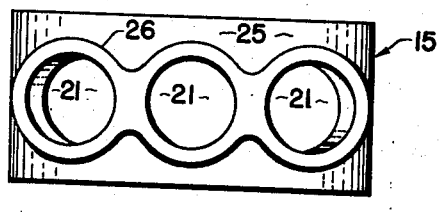
Figure 2 is a top plan view of the shoe.

Referring now to Figure 2, it will be seen the friction shoes 15 are made up of a composite construction comprising an arcuate shaped backing member 25 formed on its convex side with an upstanding portion 26 in which the spring receiving recesses 21 are formed. A friction element is mounted on and fixedly secured to the inner concave surface of the backing member 25, here shown in the form of a pair of arcuate shaped pads 30.

The friction elements 30 are formed of extremely hard material which is brittle, or frangible, having very little or no tensile strength. The material consists substantially of a ceramic base composition containing powdered metal and graphite moulded to suitable form. Such material has a substantially constant coefficient of friction within the high temperature range during the operation of the clutch, whereby the functioning of the clutch is uniform over long periods of constant use. The extreme hardness of the material results in negligible wear of the friction elements.

The backing member 25 is formed of metal having a coefficient of expansion substantially greater than that of the material of the friction elements. Aluminum is particularly well suited for this purpose. In making the composite shoe, the pre-moulded friction elements 30 are positioned in a mould, and the material of the backing member 25 is poured in molten state into the mould in contact with the convex side of the friction elements.

Figure 3:
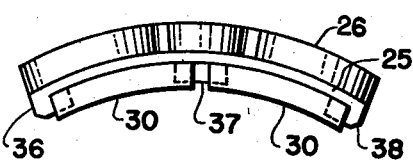
Figure 3 is a side elevational view.
Figure 5:
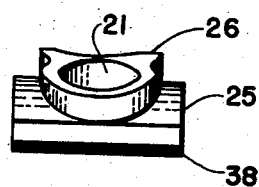
Figure 5 is an end elevational view.
Figure 4:
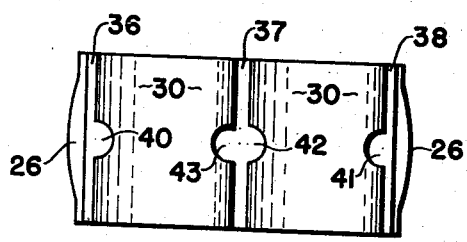
Figure 4 is a bottom plan view.

Referring particularly to Figures 3, 4 and 5, the shoe forming mould is formed so as to provide the backing member 25 with transversely extending ribs 36, 37, 38. The ribs 36 and 38 are formed at the ends of the backing member 25 and lie outwardly of the outer ends of the friction pads 30. The rib 36 has a protuberance 40 extending into a complemental notch formed in the contiguous pad 30, and the rib 38 has a similar protuberance 41 extending into a notch formed in the outer end of the other pad. The rib 37 is located centrally of the backing member and has a pair of protuberances 42, 43, for engaging notches in the inner ends of the pads 30. The ribs 36, 37, 38, and their protuberances 40, 41, 42 and 43, are of somewhat less height than the thickness of the pads 30, as is clear from Figure 3.

By reason of the ribs and protuberances above described, and due to the fact that the coefficient of expansion of the backing member 25 is substantially greater than that of the friction elements 30, the latter become fixedly gripped upon cooling of the backing member to form a composite shoe which, due to the metallic backing member 25, is rigid and possesses the necessary strength to withstand the driving and centrifugal forces to which it is subjected during the operation of the clutch. On the other hand, the friction elements 30 have the properties of withstanding high temperature operation and particularly durability, or freedom from wear. These advantages are particularly important in the speed limiting and torque metering clutches used for driving automobile accessories inasmuch as the clutches being mounted on the front end of the automobile engine crank shaft are relatively inaccessible for repair, or adjustment.

What I claim is:

A composite friction shoe comprising a preformed friction element of arcuate shape formed of a hard frangible material, said friction element having a concave, drum-engaging face and a convex face, a rigid metallic backing element of complemental shape formed of metal having a coefficient of expansion substantially greater than said frangible material and having the concave face thereof in contact with the convex face of said friction element, said backing element having a rib at either end of the friction element in a circumferential direction, said ribs extending radially inwardly and being of less height than said friction element, whereby only the concave surface of said friction element will contact a drum, each of said ribs having a generally rounded protuberance centrally thereon extending in a circumferential direction toward the center of said friction element and being of substantially the same height as said rib, said friction element having a notch at either end thereof to receive said protuberances, each said notch extending the full depth of said friction element, whereby to obtain constant friction element area as said friction shoe wears from the original surface thereof to the surface which lies in the same curved surface as said rib and protuberance.

References Cited in the file of this patent

UNITED STATES PATENTS

| | | |
|---|---|---|
| 2,161,363 | Malcom | June 6, 1939 |
| 2,719,438 | Schiefer | Oct. 4, 1955 |
| 2,746,587 | Spase | May 22, 1956 |
| 2,784,105 | Stedman et al. | Mar. 5, 1957 |

FOREIGN PATENTS

| | | |
|---|---|---|
| 500,482 | Great Britain | Feb. 7, 1939 |
| 624,614 | Great Britain | June 14, 1949 |
| 1,098,470 | France | Mar. 2, 1955 |